United States Patent Office 3,553,288
Patented Jan. 5, 1971

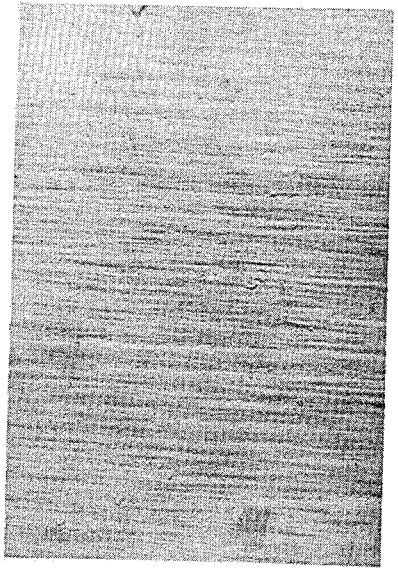
FIG.2 (CONTROL 1)
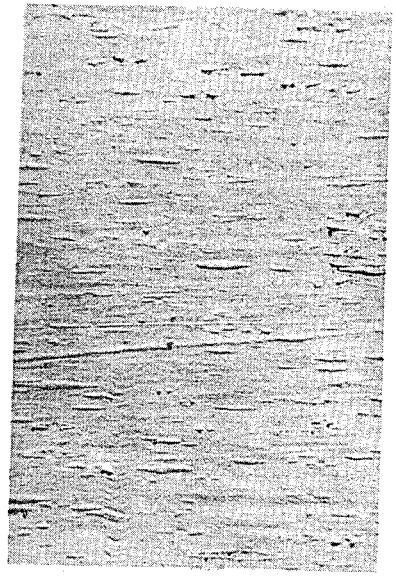
FIG.4 (EXAMPLE 2 WITHOUT THE USE OF A HOT PLATE)
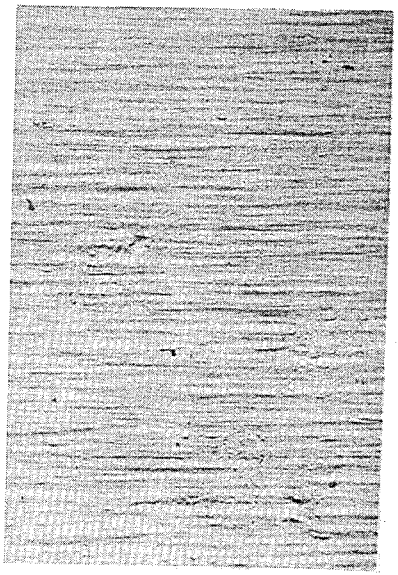
FIG.1 (EXAMPLE 2)
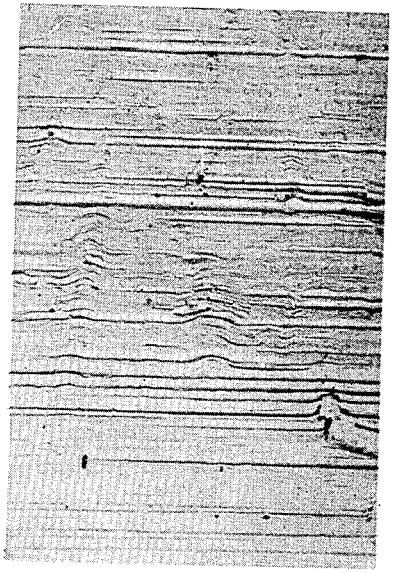
FIG.3 (CONTROL 3)

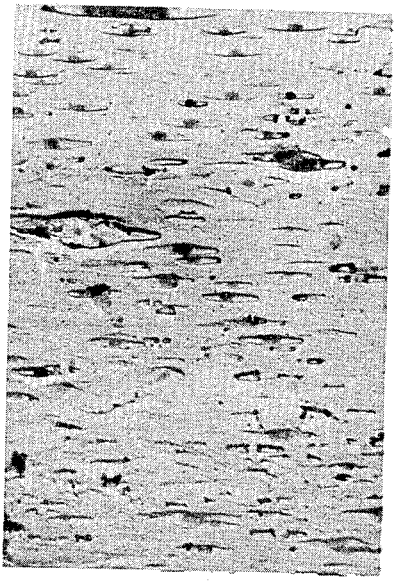
FIG. 5 (CONTROL 1 WITHOUT THE USE OF A HOT PLATE)
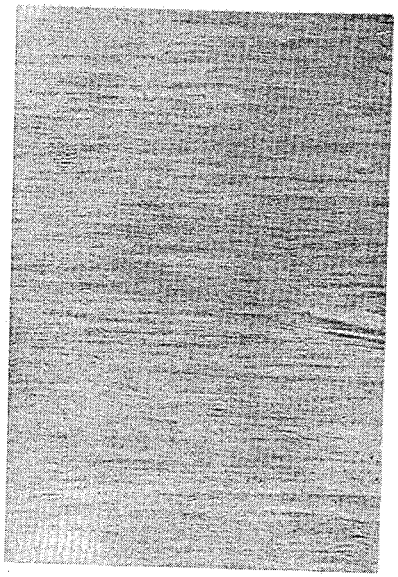
FIG. 6 (CONTROL 3 WITHOUT THE USE OF A HOT PLATE)
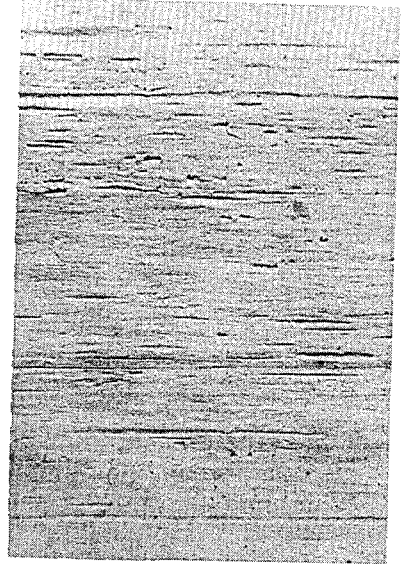
FIG. 7 (EXAMPLE 19)
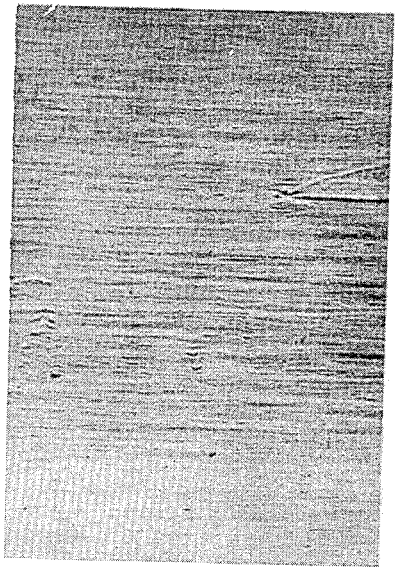
FIG. 8 (EXAMPLE 19 WITHOUT THE USE OF A HOT PLATE)

3,553,288
POLYAMIDE-POLYESTER COMPOSITION OF IMPROVED PHYSICAL PROPERTIES
Tomikazu Oda, Yoshiaki Inamoto, Takeshi Morikawa, Kogen Oo, and Umewaka Nakatani, Yamaguchi-ken, Japan, assignors to Teijin Limited, Osaka, Japan, a corporation of Japan
Continuation-in-part of application Ser. No. 612,036, Jan. 26, 1967. This application Feb. 10, 1969, Ser. No. 797,955
Claims priority, application Japan, Jan. 29, 1966, 41/5,097; Aug. 24, 1966, 41/55,729
Int. Cl. C08g 41/04
U.S. Cl. 260—857                                    6 Claims

ABSTRACT OF THE DISCLOSURE

A polyamide composition essentially comprising:
(A) 80 to 90 parts by weight of poly-$\epsilon$-caprolactam or polyhexamethylene adipamide,
(B) 20 to 10 parts by weight of a linear polyester of which more than 80 mole percent is composed of ethylene terephthalate units (with the proviso that the total amount of the said components (A) and (B) is 100 parts by weight), and
(C) 10 to 60% by weight, based on the said linear polyester (B), of a polyamide having a benzene nucleus or nuclei in the main polymer chain, the said polyamide (C) being a linear polyamide composed of at least one dicarboxylic acid with 6–10 carbon atoms and at least one diamine with 6–10 carbon atoms or further of $\epsilon$-caprolactam and having a melting point of less than 300° C., and at least 20% of the entire constituents consisting of the said dicarboxylic acid component having a benzene nucueus and/or the said diamine component having a benzene nucleus.

---

Figure 9:
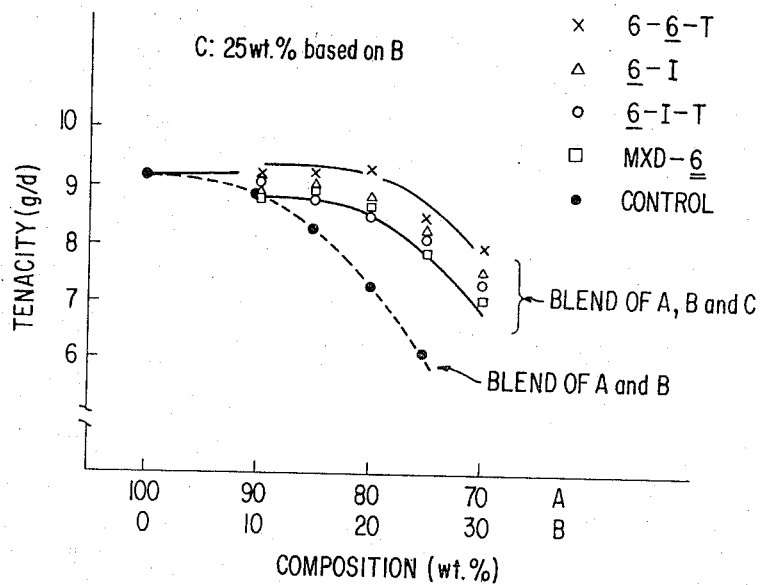

This application is a continuation-in-part of copending application Ser. No. 612,036, filed Jan. 26, 1967, now abandoned.

The present invention relates to a novel polyamide-rich composition and to fibers and filaments consisting essentially of the said composition; more particularly, the present invention relates to fibers and filaments having a high Young's modulus and to a polyamide-rich composition suitable for the manufacture of these fibers and filaments.

Heretofore, fibers and filaments used for garments, interior decoration, and for industrial purposes manufactured from an aliphatic polyamide such as poly-$\epsilon$-caprolactam (nylon 6) and polyhexamethylene adipamide (nylon 6,6) have been not fully satisfactory for use in the fields where a high Young's modulus and low creep property are required, especially carpets and tire cords, because they have a low Young's modulus and high creep property in spite of other excellent properties.

Various attempts have been made to improve the Young's modulus of fibers and filaments manufactured from nylon 6 or nylon 6,6. Many of such attempts include the copolymerization of the monomers with a component containing a residual radical which cannot easily be rotated or bent to deform the molecules with respect to the linking within the molecules, namely the aromatic nucleus having ragidity or the blending of it with a polymer comprising such a component. However, when these components are copolymerized, the melting point of the resulting copolymer is generally lowered with the increase in the amount of a component to be copolymerized with nylon 6 or 6,6 (except those capable of isomorphic substitution), and the physical properties directly relating to the melting point such as heat-resistance are deteriorated.

On the other hand, when the said nylon is copolymerized with a compound such as para-aminomethyl-benzoic acid having such a rigidity and capable of isomorphic substitution for the polyamide, there is of course no lowering of melting point and there is also no fear of the deterioration of the said properties. If, however, an isomorphically substitutable component is copolymerized with the polyamide in a great quantity, such as to fully elevate the Young's modulus of the resulting copolymer, the melting point generally gets too high and simultaneously there is a marked increase in melt viscosity. It is extremely difficult therefore to melt-shape the resulting copolymer.

As a method for improving the Young's modulus of fibers and filaments consisting of nylon 6 and nylon 6,6, it has already been proposed to use a fiber material a polymer composition prepared by blending nylon 6 or nylon 6,6 with a relatively highly rigid polymer such as aromatic polyamide and polyethylene terephthalate.

A method of blending nylon 6 or nylon 6,6 with an aromatic polyamide is reported, for example, in U.S. Pat. 3,220,456 and British specification No. 918,637, and as such an aromatic polyamide, polyhexamethylene isophthalamide, a polymer of hexamethylene diamine with 5-t-butyl-isophthalic acid, and a polymer of 4,6-dimethyl-m-phenylene diamine with suberic acid are known.

However, if one attempts to obtain a polymer composition for fibers and filaments having a high Young's modulus by blending the above-mentioned aromatic polyamide with nylon 6 or nylon 6,6, it is necessary to blend the aromatic polyamide in a considerably great amount to attain a high Young's modulus. Such a great quantity of aromatic polyamide is not desirable as it causes a decrease in the tenacity of the obtained fibers and filaments and an increase in shrinkage in boiling water and dry heat.

As an attempt, blends of nylon 6,6 (66) with polyhexamethylene isophthalamide (61) in various proportions were used as materials, and were spun and drawn. The properties of the so obtained filaments are shown in Table 1 below. Table 2 shows the properties of the filaments obtained from blends of nylon 6 (6) with polyhexamethylene isophthalamide (61) in various proportions. The marks in the parentheses correspond to those in the following Tables 1 and 2. The nylon 6, nylon 6,6 and polyhexamethylene isophthalamide used here had an intrinsic viscosity [$\eta$] of 1.3, 1.2 and 0.8, respectively. The intrinsic viscosity [$\eta$] indicated in the above and hereinafter was measured with respect to an o-chlorophenol solution of each polymer at 25° C.

The filaments shown in Tables 1 and 2 were prepared under the following spinning and drawing conditions.

Chips of each polymer composition were heated to 280° C. (for nylon 6,6 composition) and 260° C. (for nylon 6 composition) and melted (residence time being 10 minutes). The molten polymer composition was then spun to produce a yarn of 100 deniers in total consisting of 5 filaments, which was then drawn to about 5 times the original length with the use of a pin and a hot plate of 180° C.

TABLE 1

| 66/61 | 100/0 | 90/10 | 80/20 | 70/30 | 60/40 |
|---|---|---|---|---|---|
| Tenacity, g./d | 8.9 | 8.2 | 7.3 | 5.4 | 4.7 |
| Elongation, percent | 17 | 15 | 14 | 16 | 12 |
| Young's modulus, kg./mm.$^2$ | 380 | 500 | 550 | 620 | 680 |
| Shrinkage in boiling water, percent | 8.5 | 9.8 | 12.7 | 13.6 | 15.6 |

TABLE 2

| 6/61 | 100/0 | 90/10 | 80/20 | 70/30 |
| --- | --- | --- | --- | --- |
| Tenacity, g./d | 9.2 | 7.8 | 6.3 | 4.4 |
| Elongation, percent | 18 | 19 | 22 | 27 |
| Young's modulus, kg./mm.$^2$ | 300 | 410 | 530 | 570 |
| Shrinkage in boiling water, percent | 11.9 | 12.6 | 15.1 | 18.8 |

Further, an attempt to obtain a composition of high Young's modulus by blending an aromatic polyester with nylon 6 or nylon 6,6 is disclosed in Belgian Pat. Nos. 652,786 and 661,784 and Japanese patent application publication No. 26,208/65. However, because such a polyester generally has a very low compatibility with nylon 6 or nylon 6,6, the resulting blend exhibits such an undesirable deteriorating phenomenon as the separation of components from each other, and comes to have very bad shaping properties in spinning, drawing and post-treatments. For instance, if about 10% of polyethylene terephthalate is blended with nylon 6 or nylon 6,6, it is difficult to spin the resulting blend under the ordinary conditions. If the blend can be spun at all, the tenacity of the obtained filament is lowered. If more than 20% of polyethylene terephthalate is blended, the resulting composition almost cannot be spun continuously (see Controls 1 to 5 described herein below).

When nylon 6 or nylon 6,6 and polyethylene terephthalate are melted and mixed at a high temperature over a long period of time to achieve a uniform mixing, the dispersibility of each component is improved to some extent, but it is impossible to fully prevent deterioration incident to the separation of components from each other. In addition, under such severe conditions, the properties of the obtained blend are inevitably deteriorated to disadvantage by the heat decomposition of the polymer or by side-reactions incident hereto.

It appears that a method of blending polyethylene terephthalate gives a polymer composition having more excellent properties than the aforementioned method of blending an aromatic polyamide to produce a material for fibers and filaments having a high Young's modulus and low creep property by blending nylon 6 or nylon 6,6 with other polymers. The reason for this is that the blending of an aromatic polyamide may improve the Young's modulus of the obtained fibers and filaments but causes a decrease in the tenacity of the fibers and filaments as mentioned before with a concurrent increase in shrinkage in boiling water and dry heat, and that these defects are fatal to such use as tire cords which require high Young's modulus. On the other hand, if polyethylene terephthalate is blended with nylon 6 or nylon 6,6, the Young's modulus of the obtained fibers and filaments has been improved much more than that of the fibers and filaments obtained from a blend of the nylon with an aromatic polyamide, and their shrinkage in boiling water and dry heat also is not so high as in the fibers and filaments from the blend of the nylon with an aromatic polyamide (see Controls 1–5 and 10–12). Therefore, it is clear that polyethylene terephthalate is more preferable than an aromatic polyamide as the polymer to be blended with said nylon. The drawback of the blending of polyethylene terephthalate is that by the separation of components from each other, operation such as spinning, drawing and post-treatments becomes very difficult and the tenacity of the obtained filament is lowered.

A composition along the lines described above is set forth for example in U.S. Pat. 3,378,056 in the name of J. J. Robertson. This patent discloses a blended polymer composition consisting of 25 to 60 parts by weight of a polyester such as a polyethylene terephthalate; 75 to 35 parts by weight of a polyamide; for example, nylon 6 or nylon 6,6; and 0.5 to 20 parts by weight, based on the weight of the first two components of polyhexamethylene isophthalamide. As can be seen, such a composition contains the polyamide in a maximum amount of 75 parts by weight based on the weight of the polyamide and the polyester portion of the composition. Such a yarn produced from such a composition, as will be described hereinafter with respect to the specific examples, has a tenacity which is extremely low when compared to the yarns produced from the polyamide-rich composition of the present invention. In addition, when the polyester of such a composition as described above is employed in amounts greater than 30 parts by weight in the polymer blend, a spinning properties becomes very difficult, and fatal difficulties such as frequent yarn breakage occur during drawing.

Accordingly, it has been hitherto extremely difficult to obtain a polyamide composition of high Young's modulus which is provided with all the good properties such as melting point, heat-resistance and shapability. It has been noticed that the foregoing defects of a polymer composition comprising nylon 6 or nylon 6,6 and polyethylene terephthalate are due to a bad compatibility of these components with each other. It has been, therefore, assumed that if this problem of compatibility was solved, it would be possible to produce a polyamide composition for fibers and filaments having a high Young's modulus with less lowering of tenacity and without the increase in shrinkage in boiling water. Based on this assumption, the present invention has been developed.

Accordingly, it is a principal object of the present invention to provide for a polymer-rich composition which eliminates the inherent deficiencies of those compositions above enumerated.

A further object of the present invention is to provide such a polyamide-rich composition which, when formed into fibers and filaments provides such fibers and filaments with a higher tenacity and Young's modulus than heretofore obtained with conventional prior art compositions.

Yet a further object of the present invention is to provide such a polyamide-rich composition which allows for spinning and drawing operations to be performed in a very smooth manner so as to eliminate those problems previously associated with heretofore employed compositions.

A still further object of the present invention is to provide such a polyamide-rich composition comprising a blend of from 80 to 90 parts by weight of a fiber forming poly-ε-caprolactam or polyhexamethylene adipamide, 20 to 30 parts by weight of a fiber forming linear polyester and 10 to 60% by weight based on the polyester of a polyamide having a benzene nucleus or nuclei in the main polymer chain.

Still further objects and advantages of the novel polyamide-rich compositions of the present invention will become more apparent from the following more detailed description thereto.

Thus, according to the present invention, a polyamide-rich composition substantially comprising the following three polymers is provided:

(A) 80 to 90 parts by weight, preferably 80 to 85 parts by weight of a fiber-forming poly-ε-caprolactam or polyhexamethylene adipamide, (B) 20 to 10 parts by weight, preferably 20 to 15 parts by weight, of a fiber-forming linear polyester of which more than 80 mole percent is composed of ethylene terephthalate units (with the proviso that the total amount of said polyamide (A) and polyester (B) is 100 parts by weight), and (C) 10 to 60% by weight, based on the said polyester (B), of a polyamide having a benzene nucleus or nuclei in the main polymer chain and having a melting point of less than 300° C., the said polyamide (C) being a linear polyamide composed of at least one dicarboxylic acid with 6–10 carbon atoms and at least one diamine with 6–10 carbon atoms or further of ε-caprolactam. At least 20% of the entire constituents consist of the dicarboxylic acid component having a benzene nucleus and/or the said diamine component having a benzene nucles. This polyamide-rich composition of the present invention can be easily made into fibers and filaments by the ordinary melt-spinning operations. Such operations as drawing and post-treatment of the fibers and filaments obtained are also relatively easy, and it is possible to obtain fibers and filaments with a high Young's modulus and low creep property.

It is because the further addition of a specific polyamide of said (C) to the said polyamide (A) and polyester (B) leads to a remarkable improvement of compatibility between the said polymers (A) and (B) that the polyamide-rich composition of this invention can be easily made into fibers and filaments by the ordinary melt-spinning operation and the fibers and filaments obtained according to this invention have such excellent properties as mentioned above.

It has also been found, in accordance with the present invention, that in order to obtain an improvement and increase in the tenacity and Young's modulus as well as an improvement in the compatibility of the polymeric components, it is necessary that such components (A), (B) and (C) be employed in those amounts described above.

It is undesirable however to incorporate the polyamide (C) into the composition of this invention in too great an amount, because the addition of too much polyamide (C) causes a decrease in tenacity of the obtained fibers and filaments and an increase in their shrinkage in boiling water and dry heat. On the other hand, if the amount of polyamide (C) is too small, the compatibility between the polymers (A) and (B) cannot be improved. It is essential therefore according to this invention to adjust the amount of the polyamide (C) to 10–60% by weight, particularly 20–50% by weight, based on the polyester (B).

Furthermore, according to this invention, the poly-ε-caprolactam or polyhexamethylene adipamide (A) must be used in an amount of 80 to 90 parts by weight, preferably 80 to 85 parts by weight, and the polyester (B) must be used in an amount of 20 to 10 parts by weight, preferably 20 to 15 parts by weight.

Again it is pointed out that the improvement associated with the polyamide-rich composition of the present invention is achieved only when the various polymeric components are employed in those amounts described above.

It is imperative that the total amount of the polymers (A) and (B) should be 100 parts by weight. If the amount of polyester (B) based on the said polyamide (A) exceeds the upper limit, the effect of improving the Young's modulus and creep property of the obtained fibers and filaments is not so great, and even if the polyamide (C) is incorporated into the blend, the spinning drawing and post-treatments meet with difficulties and good quality fibers and filaments cannot be prepared.

If the amount of said polyester is smaller than the lower limit, it is impossible to obtain fibers and filaments having the desired Young's modulus and creep property.

Accordingly, the most preferable proportion of the polymers (A), (B) and (C) is as follows:

(A): 80 to 85 parts by weight,
(B): 20 to 15 parts by weight,
(A)+(B): 100 parts by weight,
(C): 20 to 50% by weight based on the (B).

When the above-mentioned blend proportion is employed, this invention can provide fibers and filaments with a high Young's modulus, low creep property, high tenacity and stability at high temperatures (low shrinkage in boiling water) which are suitable for use in tire cords and carpets.

Now, the polymers used according to the present invention will be explained.

(A) Poly-ε-caprolactam or polyhexamethylene adipamide

These polymers are very well known as fiber-forming polymers. Any of these polymers with fiber-forming ability can be used in this invention. A copolymer or blend of either of these polymers prepared by copolymerizing or blending it with a small amount of other component may also be used.

(B) Linear polyester

According to this invention, a linear polyester, of which more than 80% is composed of ethylene terephthalate units, is used. It is preferable that such polyester should have a fiber-forming ability itself, but according to this invention, polyesters with a molecular weight not sufficient to form fibers themselves may also be used. The most typical polyester is polyethylene terephthalate. Furthermore, such a linear polyester may be a fiber-forming copolyester prepared by polymerizing terephthalic acid or its lower aliphatic ester with ethylene glycol in the further presence of another dibasic acid, other dihydric alcohol or oxycarboxylic acid. Such other dibasic acid may be any, conventionally used, e.g., aromatic dicarboxylic acids such as isophthalic acid and aliphatic dicarboxylic acids such as adipic acid and sebacic acid. Other dihydric alcohols mentioned above may be any such as propylene glycol, tetramethylene glycol and dimethylcyclohexane glycol. As the oxycarboxylic acid, para-oxybenzoic acid is preferred. In short, it is possible to use any substantially linear polyester comprising more than 80% of ethylene terephthalate units.

(C) Polyamide having a benzene nucleus of nuclei

This polyamide is a linear polyamide composed of at least one dicarboxylic acid with 6–10 carbon atoms and at least one diamine with 6–10 carbon atoms or further of ε-caprolactam and having a melting point of less than 300° C., preferably 150 to 300° C., more preferably 210 to 270° C., at least 20% of the total constituents consisting of the said dicarboxylic acid having a benzene nucleus and/or the said diamine component having a benzene nucleus.

Therefore, the said polyamide (C), i.e., polyamide having a benzene nucleus or nuclei, may be a polyamide composed of at least one dicarboxylic acid component with 6–10 carbon atoms and at least one diamine with 6–10 carbon atoms or a copolyamide of at least one of the said dicarboxylic acids and at least one of the said diamines and ε-caprolactam.

However, the said polyamide (C) used according to this invention should have a benzene nucleus-containing component in an amount of at least 20% based on the total of the said dicarboxylic acid, diamine or further ε-caprolactam. The polyamide should also have a melting point of less than 300° C., preferably 150 to 300° C., more preferably 210 to 270° C.

As indicated above, it is most preferred in accordance with the present invention that the polyamide (C) have a melting point within the range of 210 to 270° C. In this regard, when the polyamide (C) has a melting point within such range, greater compatability of the three components is obtained, since in such case, all of the components of the polyamide-rich composition melt within approximately the same range. This allows for an ease of blending and a greater control of melt-spinning conditions.

To prepare such a polyamide, any of the following benzene nucleus-containing components can be used as long as it accounts for 20% or more of the total constituents.

Diamine component having a benzene nucleus

Diamines with 6–10 carbon atoms having a benzene nucleus include such as meta-xylylene diamine, para-xylylene diamine, a mixture of these, metaphenylene diamine, 2,4-dimethyl meta-phenylene diamine, 4,6-dimethyl metaphenylene diamine and para-phenylene diamine as well as mixtures of the above.

Dicarboxylic acid component having a benzene nucleus

Dicarboxylic acids having 6–10 carbon atoms and a benzene nucleus include such as terephthalic acid, 2,5- dimethyl-terephthalic acid, isophthalic acid, and 4,6-dimethyl isophthalic acid.

The polyamide (C) used in this invention may contain the following aliphatic diamine and/or dicarboxylic acid component with 6–10 carbon atoms or further ε-caprolactam if only the diamine component and/or dicarboxylic acid component is 20% or more of the total constituents.

Diamine components 1-methyl-3,3'-dimethyl trimethylene diamine, 1-ethyl tetramethylene diamine, 1,1-dimethyl tetramethylene diamine, 1-isopropyl tetramethylene diamine, 1-methyl pentamethylene diamine, 2-ethyl pentamethylene diamine, 3-methyl-2-ethyl pentamethylene diamine, hexamethylene diamine, 2-methyl hexamethylene diamine, heptamethylene diamine, octamethylene diamine and decamethylene diamine.

Dicarboxylic acid component

Isopropyl malonic acid, 2-ethyl succinic acid, 2-methyl glutaric acid, 3-ethyl glutaric acid, 2-isopropyl glutaric acid, 3-methyl-2-ethyl glutaric acid, adipic acd, 2-methyl adipic acid, 3-methyl adipic acid, 2-ethyl adipic acid, 2,3-dimethyl adipic acid, 2-isopropyl adipic acid, 2,2'-diethyl adipic acid, pimelic acid, 2-methyl pimelic acid, 2-ethyl pimelic acid, suberic acid, azelaic acid, and sebabic acid.

Additionally, as the dicarboxylic acid having a benzene nucleus, terephthalic acid and isophthalic acid are particularly preferable, and as the diamine component having a benzene nucleus, meta-xylylene diamine, para-xylene diamine or a mixture of these is preferred.

Among the above-enumerated benzene nucleus-containing polyamides (C), the following are particularly compatible with an aromatic polyester comprising more than 80 mole percent of ethylene terephthalate units.

MXD-6, MXD-10, MXD-PXD-6, MXD-PXD-10, 6-MXD-PXD-6,

6-MXD-PXD-6, 6-MXD-PXD-6-I, 6-MXD-PXD-10-T, 6-6-T, 6-10-T, 6-6-T, 6-10-T, 6-6-10-T, 6-6-6-T, 6-I, 6-6-I, 6-6-I, 6-10-I, 6-6-6-I, 6-I-T, 6-6-I-T, 6-6-I-T, MPD-6, 2,4-DM MPD-10

The above symbols represent the following:

6: ε-caprolactam
MXD: meta-xylylene diamine,
PXD: para-xylylene diamine,
6: hexamethylene diamine,
MPD: meta-phenylene diamine,
2,4–DM MPD: 2,4-dimethyl meta-phenylene diamine,
6: adipic acid,
10: sebacic acid,
I: isophthalic acid, and
T: terephthalic acid, The composition of the present invention can be easily prepared by melt-blending the three polymers with the use of any conventionally known method and apparatus. Each of the component polymers may be of any form, and the mixing can be carried out at any time by any mixing method. For instance, solid polymers in such a form as ribbons, chips and powders may be premixed, and then melt-blended to make a homogeneous composition; the melt-blending may be carried out by adding two of the three components while one component is still in a molten state after completion of its polymerization (the polymerization is completed when the desired degree of polymerization is reached); two of the three components may be first melt-blended and the one remaining component added thereto; or the three components may be melt-blended and shaped concurrently in a shaping machine. This melt-blending operation can be carried out at atmospheric, elevated or reduced pressure by either a continuous or batch process. When the operation is conducted at an elevated pressure or atmospheric pressure, it is advantageous to perform it in an atmosphere of an inert gas to prevent the decomposition of the polymers.

It is easy to spin the composition of this invention. Especially, the filaments obtained therefrom can be easily drawn, and the operability is good. In addition to good physical properties of the composition such as melting point and heat-resistance, the filaments and fibers obtained have a very high Young's modulus and fatigue-resistance. The composition of this invention hardly shows deteriorating phenomena such as fibrillation and brittleness which result from an insufficient compatibility and which are often seen in other blended compositions. It goes without saying that this is due to a good compatibility among the component polymers. When the filaments of this invention are used for tire cords, the tenacity of the original filaments is utilized to a great extent and the tire cords have less flat spots, as compared with the tire cords prepared from the conventional blends. Additionally, the adhesion with rubber is also improved. Moreover, the fibers and filaments of this invention are excellent for use in garments, and give rise to good tactile hand not seen in the conventional nylon 6 and nylon 6,6 fibers and filaments.

Accordingly, the composition of this invention finds applications in various fields where the said properties are required, and is especially useful for use as fibers and filaments for industrial purposes.

Furthermore, one can safely incorporate into the composition of this invention various additives ordinarily contained in fibers and filaments. For instance, a viscosity stabilizer such as amines and carboxylic acids, a heat stabilizer, an ultraviolet ray absorbent, an anti-oxidant, dyestuff or pigment and an anti-static agent may be incorporated to enhance the commercial value of the fibers and filaments.

The invention will hereinafter be explained with reference to the following examples, throughout which [η] represents an intrinsic viscosity of the polymer measured with respect to its o-chlorophenol solution at 25° C. In the example, all parts are by weight.

EXAMPLES 1–12 AND CONTROLS 1–12

Preparation of polymers)

The polymers used in these examples were prepared by the following procedures.

(1) Nylon 6

ε-Caprolactam (hereinafter may be referred to as 6) was put into an autoclave followed by the addition of 1.5% of water. After replacing the inner atmosphere by nitrogen, the autoclave was sealed and heated to 250° C. Reaction was then carried out for 3 hours. Gradually, the pressure was reduced to atmospheric pressure, and polymerization was allowed to proceed at the same temperature while flowing nitrogen gas. Nylon 6 with the desired [η] was obtained. The adjustment of [η] was made by the polymerization time.

(2) Nylon 6,6

An aqueous solution (concentration being 60%) of 6,6 nylon salt was prepared from hexamethylene diamine (to be referred to as 6 hereinafter) and adipic acid (to be referred to as 6 hereinafter). It was put into an autoclave, and heated to 220° C. and 2 hours later to 280° C. All this while, the pressure was maintained at 20 kg./cm.². Gradually, the pressure was reduced to atmospheric pressure. Nitrogen was flowed at the same temperature, and when necessary, the reduced pressure was maintained. Nylon 6,6 with the desired [η] was obtained.

(3) Polyethylene terephthalate

A reactor provided with a rectifying column was charged with 97 parts of dimethyl terephthalate, 69 parts of ethylene glycol, 0.08 part of calcium acetate hydrate and 0.04 part of antimony trioxide, and was heated until the internal temperature reached 220° C. After removal of methanol by distillation, 0.04 part of a 50% aqueous solution of phosphorous acid was added, and the mixture was heated to an internal temperature of 250° C. under atmospheric pressure. The pressure was gradually reduced and the temperature was elevated. In about 60 minutes, the pressure was 0.3 to .08 mm. Hg and the temperature, 275° C. Then, the polymerization was continued until the desired degree of polymerization was attained, thereby forming a polymer.

To obtain a copolymer, some part of dimethyl terephthalate was replaced by dimethyl isophthalate according to the proportion of the copolymer, and copolymerization was performed in the same manner as in the preparation of polyethylene terephthalate.

(4) 6-6-T copolyamide

6-T nylon salt was synthesized by crystallization method from hexamethylene diamine (6) and terephthalic acid (to be referred to as T hereinafter). This was converted into its aqueous slurry, and together with ε-caprolactam, put into an autoclave. The reactants were heated to 280° C. for 3 hours. All this while, the pressure was maintained at 20 kg./cm.$^2$. The pressure was gradually reduced to atmospheric pressure, and when necessary, nitrogen gas was flowed at the same temperature. A copolyamide with the desired [η] was obtained.

(Production of composition and filaments)

As shown in Table 3, poly-ε-caprolactam (Examples 1–10 and Controls 1–8) with an intrinsic viscosity of 1.3 or polyhexamethylene adipamide (Examples 11 and 12 and Controls 9–12) with an intrinsic viscosity of 1.2 as component (A), polyethylene terephthalate with an intrinsic viscosity of 0.9 as component (B) in all examples and controls in Table 3, and the said 6-6-T copolyamide as component (C) (prepared by the said method and having the properties shown in Table 3) were mechanically mixed in various prooprtions indicated by the blend proportion in Table 3.

The obtained composition was melted in an extruder (at a melting temperature of 275° C. with the time of residence in the extruder being 10 minutes), and spun to make a yarn composed of 5 filaments and having a total denier of 100. The yarn was drawn to 80% of the maximum draw ratio with the use of a pin and a hot plate of 180° C. The properties of the obtained yarn are shown in Table 3.

In the table, the shrinkage in boiling water was measured by winding the filaments around a reel, immersing the wound filaments in boiling water for 30 minutes, drying them in air, and then determining the change in length. The melting point was measured by the differential thermal analysis.

The following are clear from Table 3.

(1) When there is used 6-6-T copolyamide with more than 20% of the benzene nucleus component (terephthalic acid), the compatibility is improved, and it is easy to produce fibers and filaments having a high Young's modulus and tenacity. In this case, the intrinsic viscosity of 6-6-T has hardly any influence and 6-6-T copolyamide with any intrinsic viscosity can be used (Examples 1–7).

On the other hand, if 6-6-T is not used, the blending of polyethylene terephthalate makes the spinning and drawing harder, and the tenacity of the obtained fibers and filaments is decreased and their Young's modulus cannot be easily enhanced. When polyethylene terephthalate is blended in an amount of 30%, it is even impossible to spin the blend. Furthermore, if even 6-6-T is used, it is impossible to improve the compatibility unless the benzene nucleus component exceeds 20% and the advantage of using it is not exhibited (Controls 1–7).

(2) If the blend proportion is varied within the range recited in accordance with the present invention, filaments of good quality can be obtained in all cases. But if the proportion of 6-6-T to polyethylene terephthalate exceeds 60%, the obtained filaments come to have very much increased shrinkage in boiling water with the decrease in tenacity and Young's modulus. Therefore such should be avoided (Examples 9 and 10 and Control 8).

(3) Even when polyhexamethylene adipamide is used instead of poly-ε-caprolactam, the influence of 6-6-T upon operability in spinning and drawing, and tenacity and Young's modulus is conspicuous (Examples 11 and 12). When 6-6-T is not used, the blending with polyethylene terephthalate makes the spinning difficult to a greater extent than in the case of using poly-ε-caprolactam (Controls 9–12).

(4) That the operability at the time of spinning and drawing, tenacity and Young's modulus of the filaments obtained by the use of 6-6-T copolyamide are remarkably improved is supposed to be due to the compatibility of this copolyamide with poly-ε-caprolactam as, polyhexamethylene adipamide and with polyethylene terephthalate. FIGS. 1 to 3 show the electromicroscopic views of the surface of the filaments of Example 2 and Controls 1 and 3. FIGS. 4–6 are electro-microscopic views of the surfaces of the filaments prepared under the same conditions as in Example 2, Controls 1 and 3 but without the use of a hot plate during the drawing operation. The surface of filaments composed of poly-ε-caprolactam only (FIGS. 2 and 5) is very smooth, while the surface of the filaments composed of a blend of it with polyethylene terephthalate (FIG. 3) shows numerous particles or strands of polyeth-

TABLE 3

| | Component (C) | | | Blend proportion | | | Properties of drawn yarns | | | | |
|---|---|---|---|---|---|---|---|---|---|---|---|
| | Component (A) | Polymer | percent* | [η] | A | B | C | Maximum draw ratio | Tenacity, g./d. | Elongation, percent | Young's molduus, kg./mm.$^2$ | Shrinkage in boiling water percent |
| Ex. 1 | Nylon 6 | 6-6-T | 30 | 0.6 | 83 | 17 | 4 | 6.1 | 9.1 | 16 | 700 | 9.7 |
| Ex. 2 | do | 6-6-T | 25 | 0.6 | 83 | 17 | 4 | 6.2 | 9.2 | 17 | 710 | 9.8 |
| Ex. 3 | do | 6-6-T | 20 | 0.6 | 83 | 17 | 4 | 6.0 | 8.7 | 20 | 650 | 9.7 |
| Ex. 4 | do | 6-6-T | 25 | 0.3 | 83 | 17 | 4 | 5.9 | 8.5 | 23 | 650 | 9.7 |
| Ex. 5 | do | 6-6-T | 25 | 0.6 | 83 | 17 | 4 | 6.2 | 9.2 | 17 | 710 | 9.8 |
| Ex. 6 | do | 6-6-T | 25 | 0.9 | 83 | 17 | 4 | 6.0 | 8.8 | 21 | 680 | 10.0 |
| Ex. 7 | do | 6-6-T | 25 | 1.2 | 83 | 17 | 4 | 6.0 | 9.0 | 18 | 720 | 10.2 |
| Cont. 1 | do | | | | 100 | 0 | 0 | 6.3 | 9.2 | 18 | 300 | 11.0 |
| Cont. 2 | do | | | | 90 | 10 | 0 | 5.6 | 8.9 | 18 | 400 | 10.4 |
| Cont. 3 | do | | | | 83 | 17 | 0 | 5.0 | 7.6 | 17 | 480 | 9.0 |
| Cont. 4 | do | | | | 80 | 20 | 0 | 4.7 | 7.3 | 20 | 570 | 9.0 |
| Cont. 5 | do | | | | 70 | 30 | 0 | | | | | |
| Cont. 6 | do | 6-6-T | 10 | 0.6 | 83 | 17 | 4 | 5.3 | 7.2 | 24 | 520 | 10.1 |
| Cont. 7 | do | 6-6-T | 5 | 0.6 | 83 | 17 | 4 | 5.2 | 7.6 | 21 | 490 | 9.8 |
| Ex. 8 | do | 6-6-T | 25 | 0.6 | 80 | 20 | 10 | 5.8 | 9.2 | 18 | 680 | 10.3 |
| Ex. 9 | do | 6-6-T | 25 | 0.6 | 80 | 20 | 5 | 6.1 | 9.3 | 18 | 750 | 10.0 |
| Ex. 10 | do | 6-6-T | 25 | 0.6 | 80 | 20 | 2 | 5.9 | 8.5 | 20 | 580 | 9.5 |
| Cont. 8 | do | 6-6-T | 25 | 0.6 | 80 | 20 | 20 | 5.8 | 7.9 | 17 | 560 | 13.0 |
| Ex. 11 | Nylon 66 | 6-6-T | 25 | 0.6 | 83 | 17 | 4 | 5.8 | 8.1 | 17 | 800 | 8.4 |
| Ex. 12 | do | 6-6-T | 25 | 0.6 | 80 | 20 | 5 | 5.9 | 8.6 | 18 | 820 | 8.3 |
| Cont. 9 | do | | | | 100 | 0 | 0 | 6.0 | 8.9 | 17 | 380 | 8.5 |
| Cont. 10 | do | | | | 90 | 10 | 0 | 5.5 | 8.2 | 16 | 520 | 8.0 |
| Cont. 11 | do | | | | 80 | 20 | 0 | 4.5 | 6.0 | 17 | 580 | 7.3 |
| Cont. 12 | do | | | | 70 | 30 | 0 | | | | | |

*Mole percent of the constituent having benzene nucleus in Component (C).

ylene terephthalate deposited (FIGS. 3 and 6). This tendency is especially remarkable in FIG. 6. But if a tiny amount of 6–6–T is added to the said blend, it improves the compatibility between poly-ε-caprolactam and polyethylene terephthalate, and the filaments having a smooth surface very close to that of Control 1 are obtained (FIGS. 1 and 4). Such filaments are easy to spin and draw, and have a good quality.

EXAMPLE 13

A mixture of 16.2 parts of dimethyl terephthalate, 11.5 parts of ethylene glycol and 0.002 part of a 25% ethanol solution of titanium tetraethoxide was heated for 3.5 hours at 200 to 230° C. while introducing an atmosphere of nitrogen. The formed methanol was removed by distillation. The reaction mixture was maintained at 275° C. while stirring, heated for 0.5 hour at atmospheric pressure, for 0.5 hour at a pressure of 10 to 20 mm. Hg and then for 1.0 hour at a pressure of 0.1 to 0.5 mm. Hg. After removing excess ethylene glycol by distillation, 83.4 parts of powdery poly-ε-caprolactam with an intrinsic viscosity of 1.30 and 4.2 parts (25% based on the polyethylene terephthalate) of a ε-caprolactam/hexamethylene terephthalamide copolymer with an intrinsic viscosity of 1.00 and having a terephthalic acid component of 25% were added thereto, and the mixture was melted and stirred for 15 minutes under reduced pressure (0.1 to 0.5 mm. Hg) and cooled. The obtained product was pulverized, and the monomers were removed by extraction with a 30-fold amount of boiling water carried out for 3 hours, followed by drying the product. A very homogeneous white composition with an intrinsic viscosity of 1.18 was obtained.

The composition was spun at a melting temperature of 275° C. and a spinning speed of 450 m./min., and drawn to 5.3 times the original length at 180° C. A very homogeneous yarn having a tenacity of 9.1 g./d., an elongation of 19% and a Young's modulus of 670 kg./mm.$^2$ was obtained.

The composition was spun at a melting temperature of 275° C. and a spinning speed of 450 m./min., and drawn to 5.3 timse the original length at 180° C. A very homogeneous yarn having a tenacity of 9.1 g./d., an elongation of 19% and a Young's modulus of 670 kg./mm.$^2$ was obtained.

EXAMPLE 14

ε-Caprolactam (81.6 parts) and 0.8 part of water were heated for 3 hours at 255° C. in a sealed vessel, and then while introducing an atmosphere of nitrogen, heated at the same temperature for 1.5 hours under stirring. The tempolyethylene terephthalate with an intrinsic viscosity of 0.90 and 2.02 parts (11.0% based on the polyethylene terephthalate) of a powdery ε-caprolactam/hexamethylene terephthalamide copolymer having a terephthalic acid component of 30% and an intrinsic viscosity of 1.00 were added thereto. Then, the mixture was melted for 15 minutes at atmospheric pressure in an atmosphere of nitrogen and cooled. The resulting product was pulverized, and the monomers were removed by extraction with a 30-fold amount of boiling water carried out for 3 hours. A very homogeneous white composition with an intrinsic viscosity of 1.25 was obtained.

The composition was spun at a melting temperature of 275° C. and a spinning speed of 450 m./min., and drawn to 4.8 times the original length at 180° C. A very homogeneous yarn having a tenacity of 8.8 g./d., an elongation of 16% and a Young's modulus of 650 kg./mm.$^2$ was obtained.

EXAMPLE 15

Eighty-six (86) parts of polyhexamethylene adipamide with an intrinsic viscosity of 1.10, 14 parts of polyethylene terephthalate with an instrinsic viscosity of 0.60 and 7.5 parts (53.8% based on the polyethylene terephthalate) of a ε-caprolactam/hexamethylene terephthalamide copolymer having a terephthalic acid component of 30% and an intrinsic viscosity of 1.00, all in the form of chips, were mixed by a V-type blender, and the mixture was melted and stirred for 20 minutes at 275° C. and atmospheric pressure in an atmosphere of nitrogen, and cooled. A very homogeneous white composition with an intrinsic viscosity of 1.07 was obtained.

To examine the properties of this composition, it was shaped into films, and dyed with an acid dye and observed by an electroscope (with a magnification of 2000). It was found that the film was very homogeneous and the separation of components from each other was not observed.

When this composition was spun at a melting temperature of 275° C. and a spinning speed of 450 m./min. and drawn to 5.1 times the original length at 180° C., a very homogeneous yarn having a tenacity of 8.7 g./d., an elongation of 16% and a Young's modulus of 660 kg./mm.$^2$ was obtained.

EXAMPLES 16–22 AND CONTROL 13

(Preparation of polymers)

6I nylon salt and 6T nylon salt were synthesized from hemaxethylene diamine (6), isophthalic acid (I) and terephthalic acid (T). They were mixed with each other, and reacted in the same manner as in the preparation of 6–6–T copolyamide to produce a 6–I–T copolyamide with the desired intrinsic viscosity.

(Production of composition and filaments)

The poly-ε-caprolactam or polyhexamethylene adipamide as component A and polyethylene terephthalate as component B, which are the same as in Examples 1–12, and the said 6–I–T polyamide having the properties shown in Table 4 were blended in the same manner as in Examples 1–12. The resulting composition was spun and drawn. The properties of the obtained yarn are shown in Table 4.

TABLE 4

| | Component (A) | Component (C) | | | Blend proportion | | | Properties of drawn yarns | | | |
|---|---|---|---|---|---|---|---|---|---|---|---|
| | | Polymer | ⬡ percent | [η] | A | B | C | Tenacity, g./d. | Elongation, percent | Young's modulus, kg./mm.$^2$ | Shrinkage in boiling water, percent |
| Ex. 16 | Nylon 6 | 6–I–T | 50(I:T=1:1) | 1.0 | 83 | 17 | 4 | 8.8 | 18 | 700 | 9.8 |
| Ex. 17 | do | 6–I–T | 50(2:1) | 1.0 | 83 | 17 | 4 | 8.7 | 18 | 630 | 9.7 |
| Ex. 18 | do | 6–I–T | 50(4:1) | 1.0 | 83 | 17 | 4 | 8.2 | 19 | 600 | 9.8 |
| Ex. 19 | do | 6–I–T | 50(4:1) | 1.0 | 80 | 20 | 10 | 8.7 | 19 | 680 | 10.2 |
| Ex. 20 | do | 6–I–T | 50(4:1) | 1.0 | 80 | 20 | 5 | 8.3 | 17 | 650 | 9.8 |
| Ex. 21 | do | 6–I–T | 50(4:1) | 1.0 | 80 | 20 | 2 | 8.1 | 20 | 640 | 9.3 |
| Cont. 13 | do | 6–I–T | 50(I:T=2:1) | 1.0 | 80 | 20 | 20 | 7.8 | 15 | 570 | 12.8 |
| Ex. 22 | Nylon 66 | 6–I–T | 50(2:1) | 1.0 | 83 | 17 | 4 | 8.7 | 18 | 700 | 8.2 |

The following are clear from the above Table 4.

(1) Even if the proportion between isophthalic acid and terephthalic acid in the 6–I–T copolyamide is varied, since the total amount of the isophthalic acid and terephthalic acid is 50% in any case, the improvement in compatibility is observed irrespective of the proportion I and T (Examples 16 to 18).

(2) When the blend proportion of 6–I–T is varied, if 6–I–T is within the range of 10 to 60% based on the polyethylene terephthalate, the quality of the obtained yarn is excellent (Examples 19–21). If 6–I–T is used in excess, the obtained filaments have an increased shrinkage in boiling water and somewhat lowered tenacity and Young's modulus (Control 13).

(3) When polyhexamethylene adipamide is used as component (A), 6–I–T exhibits the same effects as when used with poly-ε-caprolactam (Example 22).

(4) FIG. 7 is an electro-microscopic view of the surface of the filament of Example 17. FIG. 8 is an electro-microscopic view of the surface of the filament prepared according to Example 17 but without the use of a hot plate. Deposition of polyethylene terephthalate particles or strands as in FIGS. 3 and 6 is hardly observed. This indicates that 6–I–T contributes to the improvement of compatibility of the polycaprolactam-polyethylene terephthalate system.

EXAMPLE 23

A mixture of 16.2 parts of dimethyl terephthalate, 11.5 parts of ethylene glycol and 0.002 part of a 25% ethanol solution of titanium tetraethoxide was heated for 3.5 hours at 200 to 230° C., and the formed methanol was removed by distillation. The temperature was raised to 275° C. under stirring, and the reaction mixture was heated first for 0.5 hour at atmospheric pressure, for 0.5 hour at 10 to 20 mm. Hg and then for 1.0 hour at 0.1 to 0.5 mm. Hg. After removal of excess ethylene glycol by distillation, 83.4 parts of powdery poly-ε-caprolactam with an intrinsic viscosity of 1.30 and 4.2 parts (25% based on the poly-ethylene terephthalate) of a powdery hexamethylene isophthalamide/hexamethylene terephthalamide copolymer (I/T=65/35) and an intrinsic viscosity of 1.00 were added at the same temperature, and the mixture was melted and stirred for 15 minutes under the reduced pressure (0.1 to 0.5 mm. Hg), quenched and solidified. The product was pulverized and dried. A very homogeneous white composition with an intrinsic viscosity of 1.28 was obtained.

The so obtained composition was spun at a melting temperature of 275° C. and a spinning speed of 450° m./min. and drawn to 5.3 times the original length at 180° C. A very homogeneous yarn having a tenacity of 9.1 g./d., an elongation of 19% and a Young's modulus of 670 kg./mm.² was obtained.

EXAMPLE 24

ε-Caprolactam (81.6 parts) and 0.8 part of water were heated for 3 hours at 255° C. in a sealed vessel, and then while introducing an atmosphere of nitrogen, further heated for 1.5 hours at the same temperature under stirring. While the temperature was maintained at 275° C., 18.4 parts of a powdery polyethylene terephthalate with an intrinsic viscosity of 0.90 and 2.02 parts (11.1% based on the polyethylene terephthalate) a powdery hexamethylene isophthalamide/hexamethylene terephthalamide copolymer (I/T=65/35) and an intrinsic viscosity of 1.00 were added thereto, and the mixture was melted and stirred for 15 minutes at atmospheric pressure in an atmosphere of nitrogen, quenched and solidified. The obtained product was pulverized and a very homogeneous white composition with an intrinsic viscosity of 1.25 was obtained.

This composition was spun at a melting temperature of 275° C. and a spinning speed of 450 m./min. and drawn to 4.8 times the original length at 180° C. A very homogeneous yarn having a tenacity of 8.8 g./d., an elongation of 16% and a Young's modulus of 650 kg./mm.² was obtained.

EXAMPLE 25

Eighty-six (86) parts of polyhexamethylene adipamide with an intrinsic viscosity of 1.10, 14 parts of polyethylene terephthalate with an intrinsic viscosity of 0.60 and 7.5 parts (53.8% based on the polyethylene terephthalate) of a hexamethylene isophthalamide/hexamethylene terephthalamide copolymer with an intrinsic viscosity of 1.00 (I/T=75/25), all in the form of chips were mixed by means of a V-type blender. The mixture was stirred for 20 minutes at 275° C. and atmospheric pressure in an atmosphere of nitrogen, and cooled. A very homogeneous white composition with an intrinsic viscosity of 1.07 was obtained.

To examine the properties of this composition, it was shaped into films. The obtained films were dyed with an acid dye and examined by an electromicroscope in the same manner as in Example 15. It was found that the films were very homogeneous and did not undergo any separation of components from one another.

This composition, in the meantime, was spun at a melting temperature of 275° C. and a spinning speed of 450 m./min. and drawn to 5.1 times the original length at 180° C. A very homogeneous yarn having a tenacity of 8.7 g./d., an elongation of 16% and a Young's modulus of 660 kg./mm.² was obtained.

EXAMPLES 26–28

(Preparation of polymers)

The 6–6–T, 6–10–T and 6–6–10–T copolyamides were prepared respectively from 66 and 6T nylon salts, 610 and 6T nylon salts, and 610 and 6T nylon salts blended with ε-caprolactam by the same method as described in Examples 1–12.

(Production of composition and filaments)

The same poly-ε-caprolactam and polyethylene terephthalate as in Examples 1–12 and the said 6–6–T, 6–10–T or 6–6–10–T copolyamide having the properties as shown in Table 5 were mixed in the same manner as in Examples 1–12, spun and drawn. The properties of the obtained yarns are shown in Table 5.

TABLE 5

| Component (A) | Component (C) Polymer | percent | [η] | Blend proportion A | B | C | Tenacity, g./d. | Elongation, percent | Young's modulus, kg./mm.² | Shrinkage in boiling water, percent |
|---|---|---|---|---|---|---|---|---|---|---|
| Ex. 26 | Nylon 6 | 6–6–T | 20 | 0.6 | 83 | 17 | 4 | 8.3 | 21 | 660 | 9.5 |
| Ex. 27 | do | 6–10–T | 30 | 0.6 | 83 | 17 | 4 | 8.0 | 22 | 570 | 9.7 |
| Ex. 28 | do | 6–6–10–T | 30(60:610=4:1) | 0.6 | 83 | 17 | 4 | 8.2 | 21 | 630 | 9.8 |

The following are clear from the above Table 5.

(1) It is evident from Example 26 that 6–6–T has the same effect as 6–6–T.

(2) 6–10–T is also effective for improving the compatibility (Example 27).

(3) The same as above (1) and (2) can be said with respect to 6–6–10–T (Example 28).

On the other hand, when the content of terephthalic acid was below 20%, there was no effect in the improvement of compatibility with respect to any of the polymers shown in Table 5.

EXAMPLES 29–30

(Preparation of polymers)

The 6–6–I–T and 6–6–I–T copolyamides were prepared respectively from 66 and 6T nylon salts blended with ε-caprolactam, and 66, 61 and 6T nylon salts by the same method as described in Examples 1–12.

(Production of composition and filaments)

Except the use of 6-6-I-T or 6-6-I-T copolyamide, the components were mixed in the same manner as in Examples 1–12, spun and drawn. The properties of the obtained drawn yarns are shown in Table 6.

It is clear from the above Table 7 that almost the same effect as in the case of using 6-6-T was observed when as component (C), 6-6-I was used (Examples 31–38), 6-6-I and 6-10-I were used (Examples 39–41) and also when 6-6-6-I was used (Example 42).

TABLE 6

| Component (A) | Component (C) | | | Blend proportion | | | Tenacity, g./d. | Elongation, percent | Young's modulus, kg./mm.² | Shrinkage in boiling water, percent |
|---|---|---|---|---|---|---|---|---|---|---|
| | Polymer | Percent | [η] | A | B | C | | | | |
| Ex. 29 | Nylon 6 | 6-6-I-T | 40(I:T=2:1) | 0.6 | 83 | 17 | 4 | 8.7 | 17 | 640 | 9.8 |
| Ex. 30 | do | 6-6-I-T | 40(I:T=2:1) | 0.7 | 83 | 17 | 4 | 8.4 | 21 | 610 | 9.7 |

EXAMPLES 31–42

(Preparation of polymers)

The 6-6-I, 6-6-I 6-10-I, and 6-6-6-I copolyamides were prepared respectively from 6I nylon salt blended with ε-caprolactam, 66 and 6I nylon salts, 610 and 6I nylon salts, and 66 and 6I nylon salts blended with ε-caprolactam by the same method as described in Examples 1–12.

(Production of composition and filaments)

Except the use of 6-6-I, 6-6-I, 6-10-I or 6-6-6-I copolyamide, the components were mixed in the same manner as in Examples 1–12, and the composition was spun and drawn. The properties of the obtained drawn yarns are shown in Table 7.

EXAMPLES 43–59 AND CONTROL 14

(Preparation of polymers)

The preparation of polymers of the meta-xylylene diamine (MXD) type can be carried out in the same manner as in the preparation of polymers of isophthalic acid (I) and terephthalic acid (T) type. As the diamine component having a benzene nucleus, (a blend abbreviated to XD) of MXD with PXD was used in addition to MXD.

(Production of composition and filaments)

Except the use of a copolyamide containing MXD or XD as component (C) the components were mixed in the same manner as in Examples 1–12, spun and drawn. The properties of the drawn yarns are shown in Table 8.

TABLE 7

| Component (A) | Component (C) | | | Blend proportion | | | Tenacity, g./d. | Elongation, percent | Young's modulus, kg./mm.² | Shrinkage in boiling water, percent |
|---|---|---|---|---|---|---|---|---|---|---|
| | Polymer | Percent | [η] | A | B | C | | | | |
| Ex. 31 | Nylon 6 | 6-6-I | 45 | 0.6 | 83 | 17 | 4 | 8.6 | 19 | 670 | 9.8 |
| Ex. 32 | do | 6-6-I | 40 | 0.6 | 83 | 17 | 4 | 9.0 | 18 | 660 | 10.1 |
| Ex. 33 | do | 6-6-I | 30 | 0.6 | 83 | 17 | 4 | 8.4 | 21 | 610 | 10.0 |
| Ex. 34 | do | 6-6-I | 45 | 0.3 | 83 | 17 | 4 | 8.7 | 21 | 620 | 9.6 |
| Ex. 35 | do | 6-6-I | 45 | 0.6 | 83 | 17 | 4 | 8.6 | 19 | 670 | 9.8 |
| Ex. 36 | do | 6-6-I | 40 | 0.6 | 80 | 20 | 5 | 8.6 | 18 | 650 | 9.9 |
| Ex. 37 | do | 6-6-I | 40 | 0.6 | 80 | 20 | 2 | 8.4 | 20 | 570 | 9.5 |
| Ex. 38 | Nylon 66 | 6-6-I | 45 | 0.6 | 80 | 20 | 2 | 8.0 | 17 | 670 | 8.6 |
| Ex. 39 | Nylon 6 | 6-6-I | 40 | 0.7 | 83 | 17 | 4 | 8.2 | 23 | 680 | 9.7 |
| Ex. 40 | do | 6-6-I | 30 | 0.7 | 83 | 17 | 4 | 8.1 | 23 | 670 | 9.7 |
| Ex. 41 | do | 6-10-I | 40 | 0.6 | 83 | 17 | 4 | 8.5 | 22 | 570 | 10.28 |
| Ex. 42 | do | 6-6-6-I | 40(6:66=1:4) | 0.5 | 83 | 17 | 4 | 8.5 | 20 | 550 | 10.3 |

TABLE 8

| Component (A) | Component (C) | | | Blend proportion | | | Tenacity, g./d. | Elongation, percent | Young's modulus, kg./mm.² | Shrinkage in boiling water, percent |
|---|---|---|---|---|---|---|---|---|---|---|
| | Polymer | Percent | [η] | A | B | C | | | | |
| Ex. 43 | Nylon 6 | MXD-6 | 50 | 0.7 | 83 | 17 | 4 | 9.0 | 18 | 690 | 9.4 |
| Ex. 44 | do | XD-6 | 50(m/p=7/3) | 0.4 | 85 | 15 | 6 | 8.9 | 21 | 630 | 9.3 |
| Ex. 45 | do | XD-6 | 50(m/p=7/3) | 0.7 | 85 | 15 | 6 | 8.6 | 19 | 680 | 9.3 |
| Ex. 46 | do | XD-6 | 50(m/p=7/3) | 0.0 | 85 | 15 | 6 | 8.2 | 22 | 620 | 9.6 |
| C. 14 | do | XD-6 | 50(m/p=7/3) | 0.7 | 80 | 20 | 20 | 7.9 | 24 | 530 | 12.6 |
| Ex. 47 | do | XD-6 | 50(m/p=7/3) | 0.7 | 80 | 20 | 15 | 8.7 | 20 | 700 | 10.0 |
| Ex. 48 | do | XD-6 | 50(m/p=7/3) | 0.7 | 80 | 20 | 10 | 8.5 | 21 | 660 | 9.7 |
| Ex. 49 | do | XD-6 | 50(m/p=7/3) | 0.7 | 80 | 20 | 5 | 8.2 | 21 | 570 | 9.2 |
| Ex. 50 | Nylon 66 | XD-6 | 50(m/p=7/3) | 0.7 | 80 | 20 | 5 | 8.2 | 21 | 690 | 7.8 |
| Ex. 51 | do | MXD-10 | 50 | 0.5 | 80 | 20 | 5 | 8.8 | 16 | 680 | 9.6 |
| Ex. 52 | do | XD-10 | 50(m/p=7/3) | 0.5 | 85 | 15 | 6 | 8.7 | 16 | 700 | 9.5 |
| Ex. 53 | do | 6-6-XD | 40 | 0.7 | 83 | 17 | 4 | 8.7 | 20 | 650 | 10.1 |
| Ex. 54 | do | 6-6-XD | 30 | 0.7 | 83 | 17 | 4 | 8.4 | 19 | 610 | 9.8 |
| Ex. 55 | do | 6-6-XD | 20 | 0.7 | 83 | 17 | 4 | 8.1 | 18 | 550 | 9.7 |
| Ex. 56 | do | 6-XD-6-I | 50(I/XD=1/4) | 0.6 | 83 | 17 | 4 | 8.0 | 24 | 290 | 9.8 |
| Ex. 57 | do | 6-XD-6-I | 50(I/XD=2/3) | 0. | 836 | 17 | 4 | 8.2 | 24 | 630 | 10.3 |
| Ex. 58 | do | 6-XD-6-I | 50(I/XD=4/1) | 0.6 | 83 | 17 | 4 | 8.4 | 18 | 600 | 10.2 |
| Ex. 59 | do | 6-XD-6-I | 50(I/XD=4/1) | 0.6 | 83 | 17 | 4 | 8.5 | 16 | 610 | 9.6 |

The following are clear from the above Table 8.

A polyamide of the MXD-6 type with an MXD content of 50% is also effective for the improvement of compatibility. The effect is little effected even if MXD is replaced by XD. When the polyamide of this type is copolymerized with 6-I, or 6-6 type polyamide, the appearance of effects is the same.

EXAMPLE 60

Eighty-five (85) parts of poly-ε-caprolactam with an intrinsic viscosity of 1.10, 12 parts of an ethylene terephthalate/ethylene isophthalate (90:10%) copolymer with an intrinsic viscosity of 0.60 and 3 parts of poly-m-xylylene adipamide with an intrinsic viscosity of 1.05, all in the form of chips, were mixed by means of a V-type blender, and the mixture was melted and stirred for 10 minutes at 275° C. in an atmosphere of nitrogen at atmospheric pressure, cooled and pulverized. The monomers were removed by extraction with a 30-fold amount of boiling water carried out for 3 hours, followed by drying the product. A very homogeneous white composition with an intrinsic viscosity of 1.05 was obtained.

To examine the properties of this composition, the composition was spun at a melting temperature of 265° C. at a spinning speed of 300 m./min. and drawn to 5.2 times the original length at 180° C. A very homogeneous yarn having a tenacity of 8.2 g./d., an elongation of 16% and a Young's modulus of 540 kg./mm.$^2$ was obtained.

EXAMPLES 61-62 AND CONTROL 15

The procedures of Example 60 were repeated except that an ethylene terephthalate/ethylene isophthalate copolymer (80:20%) as component B was used instead of the ethylene terephthalate/ethylene isophthalate (90:10%) copolymer, and that as component C 6-6-T or 6-I-T was used. Results are shown in Table 9.

perature was raised to 250° C., and the reaction was performed for 3 hours. The pressure was gradually reduced down to atmospheric pressure. At the same temperature, $N_2$ was flowed for 3 hours to cause the polymerization to proceed. Nylon 6 having an [η] of 1.3 was obtained.

(1-2) Nylon 66.—A 60% aqueous solution of Nylon 66 salt from hexamethylene diamine and adipic acid was prepared. It was put into an autoclave, and heated to a temperature of 220° C. and in 2 hours, to a temperature of 280° C. During this time, the pressure was maintained at 20 kg./cm.$^2$. The pressure was gradually reduced down to atmospheric pressure. At the same temperature, $N_2$ was flowed for 3 hours to cause the polymerization to proceed. Nylon 66 having an [η] of 1.2 was obtained.

(2) Component (B) (PET): Dimethyl terephthalate (97 parts) and 60 parts of ethylene glycol were charged into a reaction vessel provided with a rectifying column together with 0.08 part of calcium acetate hydrate and 0.04 part of antimony trioxide, and heated while removing methanol, until the inner temperature reached 220° C. After removal of methanol by distillation, 0.04 part of a 50% aqueous solution of phosphorous acid was added. The mixture was heated under atmospheric pressure until the inner temperature reached 220° C. The pressure was gradually lowered, and the temperature raised. In about 60 minutes, the pressure was reduced to 0.3–0.8 mm. Hg, and the temperature was raised to 275° C. Continued reaction gave polyethylene terephthalate (PET) having an [η] of 0.9.

(3) Component (C) (polyamide having a benzene nucleus, 6-6-T, 6-I, 6-I-T, MXD-6): Each of the nylon salts or ε-caprolactam was put into an autoclave as an aqueous slurry, and heated to 280° C. The reaction was conducted for 3 hours while maintaining the pressure at 20 kg./cm.$^2$. The pressure was reduced gradually to atmospheric pressure. If necessary, $N_2$ was flowed at the same temperature. A polyamide having a predetermined [η] was obtained. The results are shown in Table 10.

TABLE 9

| Component (A) | Component (C) | | | Blend proportion | | | Properties of yarns | | | |
| | Polymer |  percent | [η] | A | B | C | Tenacity, g./d. | Elongation, percent | Young's modulus, kg./mm.$^2$ | Shrinkage in boiling water, percent |
|---|---|---|---|---|---|---|---|---|---|---|
| Ex. 61 | Nylon 6 | 6-6-T | 25 | 0.6 | 83 | 17 | 4 | 8.8 | 18 | 650 | 10.0 |
| Ex. 62 | do | 6-I-T | 50(I/T=2/1) | 1.0 | 80 | 20 | 10 | 8.5 | 20 | 660 | 10.5 |
| C. 15 | do | | | | 80 | 20 | 0 | 7.0 | 17 | 450 | 9.5 |

It can be understood from the above table that the use of an ethylene terephthalate copolymer as component B also exhibits the advantage of this invention.

EXAMPLES 63-107 AND CONTROLS 16-27

The following experiments have been conducted with a view to examining the relation of the ratio of component (B) (PET) in a blend of the three components (A), (B), and (C) to the tenacity and Young's modulus of yarns obtained by spinning and drawing the blend, and also the significance of addition of component (C).

Preparation of polymers (1) Component (A): (1-1) Nylon 6.—Epsilon-caprolactam was put into an autoclave, and 1.5% by weight of water was added. After replacing the atmosphere of the autoclave by $N_2$, the autoclave was sealed. The tem-

TABLE 10

| Composition (mole ratio) | | Mole percent of  | [η] | Temp., °C.* |
|---|---|---|---|---|
| Polyamide (C): | | | | |
| 6-6-T | 6/6/T, 50/25/25 | 25 | 0.6 | 250 |
| 6-I | 6/I, 50/50 | 50 | 0.8 | 198 |
| 6-I-T | 6/I/T, 50/33.5/16.5 | 50 | 1.0 | 250 |
| MXD-6 | MXD/6, 50/50 | 50 | 0.7 | 243 |

*Melting point measured by a differential thermal analysis.

Preparation of compositions and filaments

Substantially uniform compositions were obtained by mixing mechanically the components (A), (B) and (C) at various ratios. Each of the obtained compositions was melted in an extruder (melting temperature of 275° C. and a residence time in the extruder of 10 minutes), and spun to form a 100 denier yarn composed of five filaments. The yarn was drawn to 80% of the maximum draw ratio with the use of a cold pin and a hot plate of 120° C.

Tenacity and Young's modulus of filaments

Figure 10:
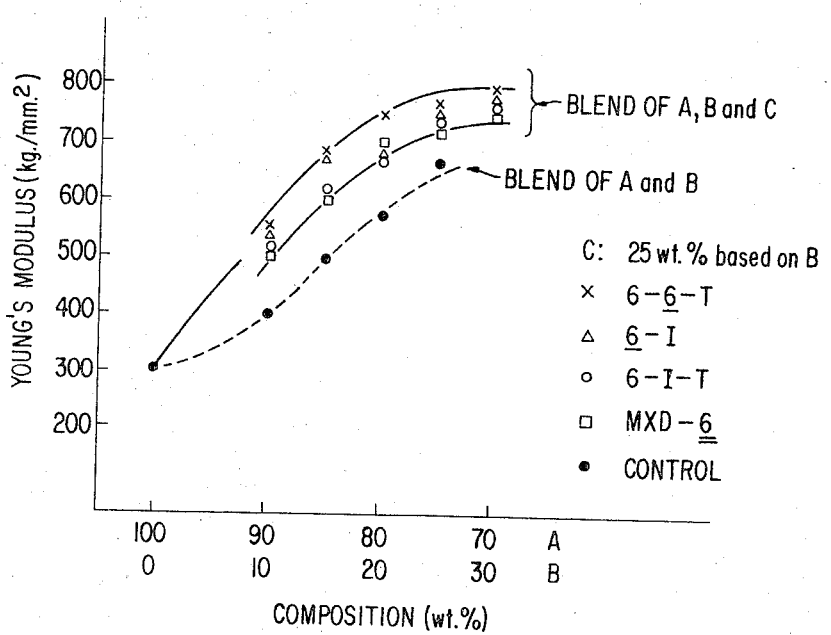
Figure 11:
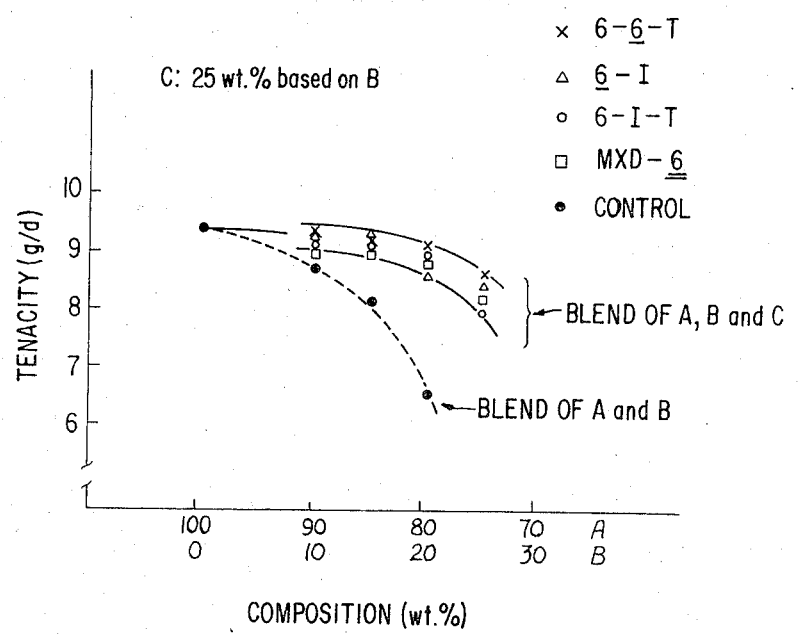
Figure 12:
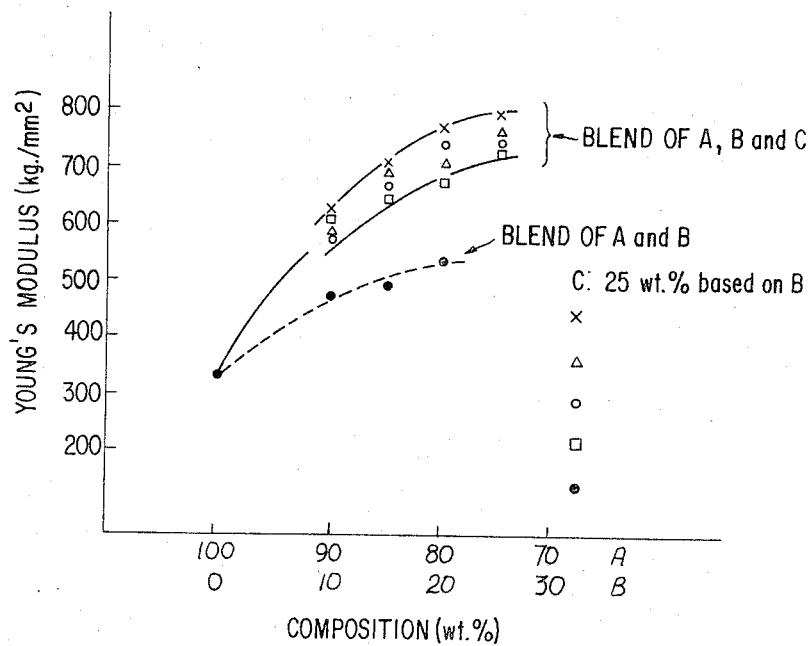

The relation of the blend proportion of the components (A), (B) and (C) to the tenacity and Young's modulus of the yarns obtained in the above-mentioned manner is shown in Table 11. The results obtained when Nylon 6 was used as component (A) are summarized in FIGS. 9 and 10, and those obtained when Nylon 66 was used as component (A) are summarized in FIGS. 11 and 12. FIGS. 9 and 11 indicate the relation of the proportion to the tenacity, and FIGS. 10 and 12, the relation of the proportion to the Young's modulus.

TABLE 11

| | Polymer components | | | Blend proportion | | | Properties of yarns | |
|---|---|---|---|---|---|---|---|---|
| | (A) | (B) | (C) | A | B | (C) * | Tenacity, g./d. | Young's modulus, kg./mm.$^2$ |
| Ex. 63 | Nylon 6 | PET | 6-6-T | 90 | 10 | (25) | 9.1 | 550 |
| Ex. 64 | do | PET | 6-6-T | 85 | 15 | (25) | 9.2 | 680 |
| Ex. 65 | do | PET | 6-6-T | 80 | 20 | (25) | 9.3 | 750 |
| Ex. 66 | do | PET | 6-6-T | 75 | 25 | (25) | 8.4 | 770 |
| Ex. 67 | do | PET | 6-6-T | 70 | 30 | (25) | 7.9 | 800 |
| Ex. 68 | do | PET | 6-6-T | 90 | 10 | (50) | 9.0 | 580 |
| Ex. 69 | do | PET | 6-6-T | 85 | 15 | (50) | 9.0 | 670 |
| Ex. 70 | do | PET | 6-6-T | 80 | 20 | (50) | 9.2 | 680 |
| Ex. 71 | do | PET | 6-6-T | 75 | 25 | (50) | 8.6 | 780 |
| Ex. 72 | do | PET | 6-6-T | 70 | 30 | (50) | 8.0 | 810 |
| Ex. 73 | Nylon 66 | PET | 6-6-T | 90 | 10 | (25) | 8.8 | 670 |
| Ex. 74 | do | PET | 6-6-T | 85 | 15 | (25) | 8.7 | 750 |
| Ex. 75 | do | PET | 6-6-T | 80 | 20 | (25) | 8.6 | 820 |
| Ex. 76 | do | PET | 6-6-T | 75 | 25 | (25) | 8.1 | 840 |
| Ex. 77 | do | PET | 6-6-T | 70 | 30 | (25) | | |
| Ex. 78 | Nylon 6 | PET | 6-I | 90 | 10 | (25) | 9.0 | 540 |
| Ex. 79 | do | PET | 6-I | 85 | 15 | (25) | 9.0 | 680 |
| Ex. 80 | do | PET | 6-I | 80 | 20 | (25) | 8.8 | 680 |
| Ex. 81 | do | PET | 6-I | 75 | 25 | (25) | 8.3 | 750 |
| Ex. 82 | do | PET | 6-I | 70 | 30 | (25) | 7.5 | 780 |
| Ex. 83 | Nylon 66 | PET | 6-I | 90 | 10 | (25) | 8.8 | 630 |
| Ex. 84 | do | PET | 6-I | 85 | 15 | (25) | 8.8 | 740 |
| Ex. 85 | do | PET | 6-I | 80 | 20 | (25) | 8.1 | 750 |
| Ex. 86 | do | PET | 6-I | 75 | 25 | (25) | 7.9 | 800 |
| Ex. 87 | do | PET | 6-I | 70 | 30 | (25) | | |
| Ex. 88 | Nylon 6 | PET | 6-I-T | 90 | 10 | (25) | 9.1 | 520 |
| Ex. 89 | do | PET | 6-I-T | 85 | 15 | (25) | 8.9 | 620 |
| Ex. 90 | do | PET | 6-I-T | 80 | 20 | (25) | 8.5 | 670 |
| Ex. 91 | do | PET | 6-I-T | 75 | 25 | (25) | 8.1 | 750 |
| Ex. 92 | do | PET | 6-I-T | 70 | 30 | (25) | 7.3 | 760 |
| Ex. 93 | Nylon 66 | PET | 6-I-T | 90 | 10 | (25) | 8.8 | 630 |
| Ex. 94 | do | PET | 6-I-T | 85 | 15 | (25) | 8.7 | 710 |
| Ex. 95 | do | PET | 6-I-T | 80 | 20 | (25) | 8.4 | 790 |
| Ex. 96 | do | PET | 6-I-T | 75 | 25 | (25) | 7.5 | 800 |
| Ex. 97 | do | PET | 6-I-T | 70 | 30 | (25) | | |
| Ex. 98 | Nylon 6 | PET | MXD-6 | 90 | 10 | (25) | 8.9 | 500 |
| Ex. 99 | do | PET | MXD-6 | 85 | 15 | (25) | 9.0 | 600 |
| Ex. 100 | do | PET | MXD-6 | 80 | 20 | (25) | 8.6 | 700 |
| Ex. 101 | do | PET | MXD-6 | 75 | 25 | (25) | 7.8 | 720 |
| Ex. 102 | do | PET | MXD-6 | 70 | 30 | (25) | 7.0 | 750 |
| Ex. 103 | Nylon 66 | PET | MXD-6 | 90 | 10 | (25) | 8.6 | 670 |
| Ex. 104 | do | PET | MXD-6 | 85 | 15 | (25) | 8.5 | 700 |
| Ex. 105 | do | PET | MXD-6 | 80 | 20 | (25) | 8.3 | 720 |
| Ex. 106 | do | PET | MXD-6 | 75 | 25 | (25) | 7.7 | 770 |
| Ex. 107 | do | PET | MXD-6 | 70 | 30 | (25) | | |
| Cont. 16 | Nylon 6 | | | 100 | 0 | 0 | 9.2 | 300 |
| Cont. 17 | do | PET | | 90 | 10 | 0 | 8.9 | 400 |
| Cont. 18 | do | PET | | 85 | 15 | 0 | 8.3 | 500 |
| Cont. 19 | do | PET | | 80 | 20 | 0 | 7.3 | 570 |
| Cont. 20 | do | PET | | 75 | 25 | 0 | 6.1 | 670 |
| Cont. 21 | do | PET | | 70 | 30 | 0 | | |
| Cont. 22 | Nylon 66 | | | 100 | 0 | 0 | 8.9 | 380 |
| Cont. 23 | do | PET | | 90 | 10 | 0 | 8.2 | 520 |
| Cont. 24 | do | PET | | 85 | 15 | 0 | 7.6 | 540 |
| Cont. 25 | do | PET | | 80 | 20 | 0 | 6.0 | 580 |
| Cont. 26 | do | PET | | 75 | 25 | 0 | | |
| Cont. 27 | do | PET | | 70 | 30 | 0 | | |

* Weight percent based on component (B).

(1) In FIGS. 9, 10, 11 and 12, the tenacity and Young's modulus values of the yarns obtained from blended compositions composed of components (A) and (B) only are indicated by dotted lines, and those of the yarns obtained from blended compositions composed of components (A), (B) and (C) are indicated by solid lines.

It is seen from the comparison of the dotted lines with the solid lines that by adding component (C), i.e., a polyamide having a benzene nucleus or nuclei in the main chain, to components (A) and (B), the tenacity and Young's modulus of the obtained yarn are improved very remarkably.

(2) It is seen from each plot corresponding to A100 in each graph that polyamides (Nylon 6 and Nylon 66) have an excellent tenacity, but are low in Young's modulus. When polyethylene terephthalate (component B) is added to polyamide (component A), the Young's modulus is improved abruptly. But when the proportion of the polyethylene terephthalate reaches more than 20 parts by weight, there is an appreciable abrupt decrease in tenacity even in the yarns obtained from the compositions composed of components (A), (B) and (C).

(3) It will be understood from all these that a yarn obtained from a blended composition consisting of three polymer components (A), (B) and (C) in which component (A) (polyamide) is 80-90 parts by weight, and component (B) (PET) is 20-10 parts by weight has an excellent tenacity similar to polyamides and a far more excellent Young's modulus than the polyamides.

This, therefore, indicates that to achieve the advantageous results of the present invention, the components A, B and C must be present in the polyamide-rich composition in those proportions described.

It is, therefore, evident that such yarns obtained from the three-component blended composition of the present invention are very excellent for use in tire cords, carpets and other commercial fibers.

We claim:
1. A polyamide composition for the preparation of fibers and filaments consisting essentially of
    (A) 80 to 90 parts by weight of poly-ε-caprolactam or polyhexamethylene adipamide,
    (B) 20 to 10 parts by weight of a linear polyester of which more than 80 mole percent is composed of ethylene terephthalate units (with the proviso that the total amount of the said components (A) and (B) is 100 parts by weight), and
    (C) 10 to 60% by weight, based on the said linear polyester (B), of a polyamide having a benzene nucleus or nuclei in the main polymer chain,
the said polyamide (C) being a linear polyamide composed of at least one dicarboxylic acid with 6-10 carbon atoms and at least one diamine with 6-10 carbon atoms or further of ε-caprolactam and having a melting point of less than 300° C., and at least 20% of the entire constituents consisting of the said dicarboxylic acid component having a benzene nucleus or the said diamine component having a benzene nucleus.

2. A polyamide composition for the preparation of fibers and filaments consisting essentially of
    (A) 80 to 85 parts by weight of poly-ε-caprolactam or polyhexamethylene adipamide,
    (B) 20 to 15 parts by weight of a linear polyester of which more than 80 mole percent is composed of ethylene terephthalate units (with the proviso that the total amount of the said components (A) and (B) is 100 parts by weight), and
    (C) 20 to 50% by weight, based on the said linear polyester (B), of a polyamide having a benzene nucleus or nuclei in the main polymer chain,
the said polyamide (C) being a linear polyamide composed of at least one dicarboxylic acid with 6-10 carbon atoms and at least one diamine with 6-10 carbon atoms or further of ε-caprolactam and having a melting point of less than 300° C., and at least 20% of the entire constituents consisting of the said dicarboxylic acid component having a benzene nucleus or the said diamine component having a benzene nucleus.

3. A polyamide composition of claim 1, wherein said component (C) has a melting point within the range of 210-270° C.

4. A polyamide composition of claim 2, wherein said component (C) has a melting point within the range of 210-270° C.

5. Fibers and filaments consisting essentially of the polyamide composition of claim 1.

6. Fibers and filaments consisting essentially of the polyamide composition of claim 2.

References Cited

UNITED STATES PATENTS

| | | | |
|---|---|---|---|
| 3,369,057 | 2/1968 | Twilley | 260—857 |
| 3,378,055 | 4/1968 | Robertson | 260—857 |
| 3,378,056 | 4/1968 | Robertson | 260—857 |
| 3,378,602 | 4/1968 | Robertson | 260—857 |
| 3,382,305 | 5/1968 | Breen | 260—857 |

OTHER REFERENCES

Man Made Fibers, Moncrieff, London, 1959, National Trade Press Ltd., p. 303.

PAUL LIEBERMAN, Primary Examiner

U.S. Cl. X.R.

260—75, 78